United States Patent
Fisher

(10) Patent No.: US 8,792,939 B2
(45) Date of Patent: Jul. 29, 2014

(54) NON-WIRELESS BIDIRECTIONAL COMMUNICATION BETWEEN A MOBILE DEVICE AND ASSOCIATED SECURE ELEMENT USING AN AUDIO PORT

(75) Inventor: Michelle Fisher, Oakland, CA (US)

(73) Assignee: Michelle Fisher, Oakland, CA (US)

( * ) Notice: Subject to any disclaimer, the term of this patent is extended or adjusted under 35 U.S.C. 154(b) by 0 days.

(21) Appl. No.: 13/312,049

(22) Filed: Dec. 6, 2011

(65) Prior Publication Data
US 2013/0137367 A1 May 30, 2013

Related U.S. Application Data

(60) Provisional application No. 61/445,667, filed on Feb. 23, 2011, provisional application No. 61/431,007, filed on Jan. 9, 2011, provisional application No. 61/429,246, filed on Jan. 3, 2011.

(51) Int. Cl.
*H04M 1/00* (2006.01)
*H04B 1/38* (2006.01)

(52) U.S. Cl.
USPC ......... 455/557; 455/41.1; 455/41.2; 455/410; 455/411; 455/552.1; 455/553.1; 455/556.1; 455/558; 340/13.24; 340/13.25; 340/13.26; 340/572.1

(58) Field of Classification Search
USPC ............... 455/41.1, 41.2, 410, 411, 418–420, 455/557, 558, 552.1, 553.1, 556.1, 556.2; 340/572.1, 10.1, 10.3, 10.4, 10.42, 340/10.5, 10.51, 10.52, 13.24–13.26, 5.2, 340/5.4, 5.41
See application file for complete search history.

(56) References Cited

U.S. PATENT DOCUMENTS

| | | | | |
|---|---|---|---|---|
| 6,405,019 | B1 * | 6/2002 | Murray | 455/67.11 |
| 7,126,481 | B2 * | 10/2006 | Vesikivi et al. | 340/572.4 |
| 7,200,420 | B2 * | 4/2007 | Rankin | 455/558 |
| 7,407,107 | B2 * | 8/2008 | Engestrom et al. | 235/472.01 |
| 7,606,533 | B2 * | 10/2009 | Perttila et al. | 455/41.2 |
| 7,756,467 | B2 * | 7/2010 | Bent et al. | 455/3.04 |
| 7,865,141 | B2 * | 1/2011 | Liao et al. | 455/41.2 |

* cited by examiner

*Primary Examiner* — Tuan A Tran

(57) ABSTRACT

In some embodiments, a system includes a mobile communication device and a secure element physically coupled to the mobile communication device. The mobile communication device includes a first wireless transceiver, first processor, first memory, first speaker, first microphone, first Audio To Digital conversion (ADC), and audio port. The secure element includes a second wireless transceiver, second processor, second memory, second Audio To Digital conversion (ADC), second Digital To Audio conversion (DAC), and cable with 3.55 mm plug that is inserted into the audio port of the mobile communication device. The mobile communication device is configured to transmit data non-wirelessly via the cable to the secure element using an analog signal. The secure element is configured to transmit data non-wirelessly via the cable inserted into the audio port of the the mobile communication device using an analog signal.

36 Claims, 14 Drawing Sheets

NON-WIRELESS BIDIRECTIONAL COMMUNICATION BETWEEN A MOBILE DEVICE AND ASSOCIATED SECURE ELEMENT USING AN AUDIO PORT

CLAIM OF PRIORITY

This application claims priority U.S. Provisional Patent Application No. 61/445,667, entitled "Non-Wireless Bidirectional Communication Between a Mobile Device and Associated Secure Element using an Audio Port" filed on Feb. 23, 2011 which claims priority to U.S. Provisional Patent Application No. 61/431,007, entitled "Non-Wireless Bidirectional Communication Between a Mobile Device and Associated Secure Element" filed on Jan. 10, 2011 which claims priority to U.S. Provisional Patent Application No. 61/429,246 entitled "Wireless Bidirectional Communications between a Mobile Device and Associated Secure Element using Inaudible Sound Waves," filed Jan. 3, 2011 which is a continuation in part of U.S. patent application Ser. No. 12/948,717, entitled "Wireless Bidirectional Communications between a Mobile Device and Associated Secure Element," filed Nov. 17, 2010 which is a continuation in part U.S. patent application Ser. No. 11/933,321, entitled "Method and System for Adapting a Wireless Mobile Communication Device for Wireless Transactions," filed Oct. 31, 2007, which is a continuation-in-part of U.S. patent application Ser. No. 11/467,441, entitled "Method and Apparatus for Completing a Transaction Using a Wireless Mobile Communication Channel and Another Communication Channel," filed Aug. 25, 2006, which claims priority to U.S. Provisional Patent Application Nos. 60/766,171 and 60/766,172. All of the above-referenced patent applications are incorporated by reference herein.

RELATED APPLICATIONS

Other patents referenced include U.S patent application Ser. No 13/308,440 entitled "Automatic Redemption Of Digital Artifacts Using An NFC Enabled Mobile Device" filed on Nov. 30, 2011 which claims priority to U.S. Provisional Patent Application No. 13/184,209 entitled "Method and Systems of loading and unloading digital artifacts between a mobile device with an associated secure element and other remote devices" filed on Jul. 15, 2011 which claims priority to U.S. Provisional Patent Application No. 61/442,384 entitled "Method and Systems of loading and unloading digital between a mobile device with an associated secure element and other remote devices" filed on Feb. 14, 2011; U.S patent application Ser. No. 13/229,004, entitled "Streamlining NFC Transactions With Multiple Secure Elements" filed on Sep. 9, 2011 which is a continuation in part and claims priority to U.S. Pat. No. 13/213,840, entitled "Transferring Data Between NFC Enabled Mobile Devices With Multiple Secure Elements" filed on Aug. 19, 2011 which is a continuation in part and claims priority to U.S. Pat. No. 13/208,247, entitled "Transferring Data Between NFC Enabled Mobile Devices " filed on Aug. 11,2011 which is a continuation in part of U.S. Pat. No. 13/184,209, entitled "Method and Systems of loading and unloading digital artifacts between a mobile device with an associated secure element and other remote devices" filed on Jul. 15, 2011 which claims priority to U.S. Provisional Patent Application No. 61/442,384, entitled "Method and Systems of loading and unloading digital between a mobile device with an associated secure element and other remote devices" filed on Feb. 14, 2011;, U.S patent application Ser. No. 13/221,706, entitled, "Dynamic Provisioning of NFC Applications" filed Aug. 30, 2011 which is a continuation in part and claims priority to U.S. Pat. No. 13/213,840, entitled "Transferring Data Between NFC Enabled Mobile Devices With Multiple Secure Elements" filed on Aug. 19, 2011 which is a continuation in part and claims priority to U.S. Pat. No. 13/208,247, entitled "Transferring Data Between NFC Enabled Mobile Devices " filed on Aug. 11,2011 which is a continuation in part of U.S. Pat. No. 13/184,209, entitled "Method and Systems of loading and unloading digital artifacts between a mobile device with an associated secure element and other remote devices" filed on Jul. 15, 2011 which claims priority to U.S. Provisional Patent Application No. 61/442,384, entitled "Method and Systems of loading and unloading digital between a mobile device with an associated secure element and other remote devices" filed on Feb. 14, 2011; U.S patent application Ser. No 13/216,098 entitled, "Streamlining NFC Transactions Using A Mobile Communication Device " filed on Aug. 23, 2011 which is a continuation in part and claims priority to U.S patent application Ser. No. 13/215,069 entitled "Transferring Data From an NFC Enabled Mobile Device to a Remote Device" filed on Aug. 22, 2011 which is a continuation in part of U.S patent application Ser. No. U.S. Pat. No. 13/213,840, entitled "Transferring Data Between NFC Enabled Mobile Devices With Multiple Secure Elements" filed on Aug. 19, 2011 which is a continuation in part and claims priority to U.S. Pat. No. 13/208,247, entitled "Transferring Data Between NFC Enabled Mobile Devices " filed on Aug. 11,2011 which is a continuation in part of U.S. Pat. No. 13/184,209, entitled "Method and Systems of loading and unloading digital artifacts between a mobile device with an associated secure element and other remote devices" filed on Jul. 15, 2011 which claims priority to U.S. Provisional Patent Application No. 61/442,384, entitled "Method and Systems of loading and unloading digital between a mobile device with an associated secure element and other remote devices" filed on Feb. 14, 2011, U.S patent application Ser. No 13/195, 055, entitled, "Social Media Marketing Based on Transactions Using a Mobile Device and Associated Secure Element filed on August 1, 2011, U.S patent application Ser. No. 13/184,246, entitled "Using a Mobile Device to Enable Purchase of Deals and Increase Customer Loyalty" filed on Jul. 15, 2011 which claims priority to U.S. Provisional Patent Application 61/504,088 titled "Using a mobile device to enable purchase of deals and increase customer loyalty" filed on Jul. 1, 2011; U.S patent application Ser. No. 13/184,209 Method And Systems Of Loading And Unloading Digital Artifacts Between A Mobile Device And An Associated Secure Element And Other Remote Devices filed on Jul. 15, 2011 which claims priority to U.S. Provisional Patent Application 61/442,384 titled "Method and Systems of loading and unloading digital between a mobile device with an associated secure element and other remote devices" filed on Feb. 14, 2011; U.S patent application Ser. No. 11/944,267, entitled "Method and System for Delivering Information to a mobile communication device based on consumer transactions", filed Nov. 21, 2007 and U.S. patent application Ser. No. 11/956,261 entitled "Method and System for Delivering Customized Information To A Mobile Communication Device Based on User Affiliations", filed Dec. 13, 2007. All of the above-referenced patent applications are incorporated by reference herein.

TECHNICAL FIELD

The disclosed embodiments relate generally to wireless communications for a mobile device, and more particularly, to wireless communications between a mobile device and an associated secure element using sound waves.

BACKGROUND

A secure element can be physically coupled to a mobile communication device to allow for transactions with remote terminals such as point-of-sale and point-of-entry terminals. Implementing wireless communications between the mobile communication device and the secure element, however, presents challenges. For example, it is desirable to transmit data between the mobile communication device and the secure element in a manner that allows for easy receipt of the data especially in cases where a wireless carrier network or WIFI connection is not available. Also, a method of communication between the mobile communication device and the secure element should allow for convenient activation of the secure element and remote deactivation of the secure element.

SUMMARY

Disclosed embodiments allow a mobile communication device to communicate non-wirelessly with a secure element that is physically coupled to the mobile communication device. Communications from the mobile communication device to the secure element use a different protocol than communications from the secure element to the mobile communication device.

In some embodiments, a system includes a mobile communication device and a secure element physically coupled to the mobile communication device. The mobile communication device includes a first wireless transceiver, first processor, first memory, first microphone, first speaker, first audio to digital converter(ADC), first battery, and audio port. The secure element includes a second wireless transceiver, second processor, second memory, a second audio to digital converter (ADC), a second audio to digital to audio converter (DAC), and an audio cable with 3.55 mm plug that can be inserted into audio port of mobile communication device. The mobile communication device is configured to transmit data via the audio cable connected to the secure element. The secure element is configured to transmit data via the audio cable to the mobile communication device In some embodiments, a method of communicating between a mobile communication device and a secure element physically coupled to the mobile communication device is performed. The mobile communication device includes a first microphone, first wireless transceiver, first processor, and first memory, and the secure element includes a second wireless transceiver, second processor, and second memory. The method includes non-wireless transmission of data between the mobile communication device and the secure element via a cable that connects from the secure element into the audio port of the mobile communication device.

BRIEF DESCRIPTION OF THE DRAWINGS

Like reference numerals refer to corresponding parts throughout the drawings.

DESCRIPTION OF EMBODIMENTS

Reference will now be made in detail to various embodiments, examples of which are illustrated in the accompanying drawings. In the following detailed description, numerous specific details are set forth in order to provide a thorough understanding of the present inventions. However, it will be apparent to one of ordinary skill in the art that the present inventions may be practiced without these specific details. In other instances, well-known methods, procedures, components, and circuits have not been described in detail so as not to unnecessarily obscure aspects of the embodiments.

Figure 1:
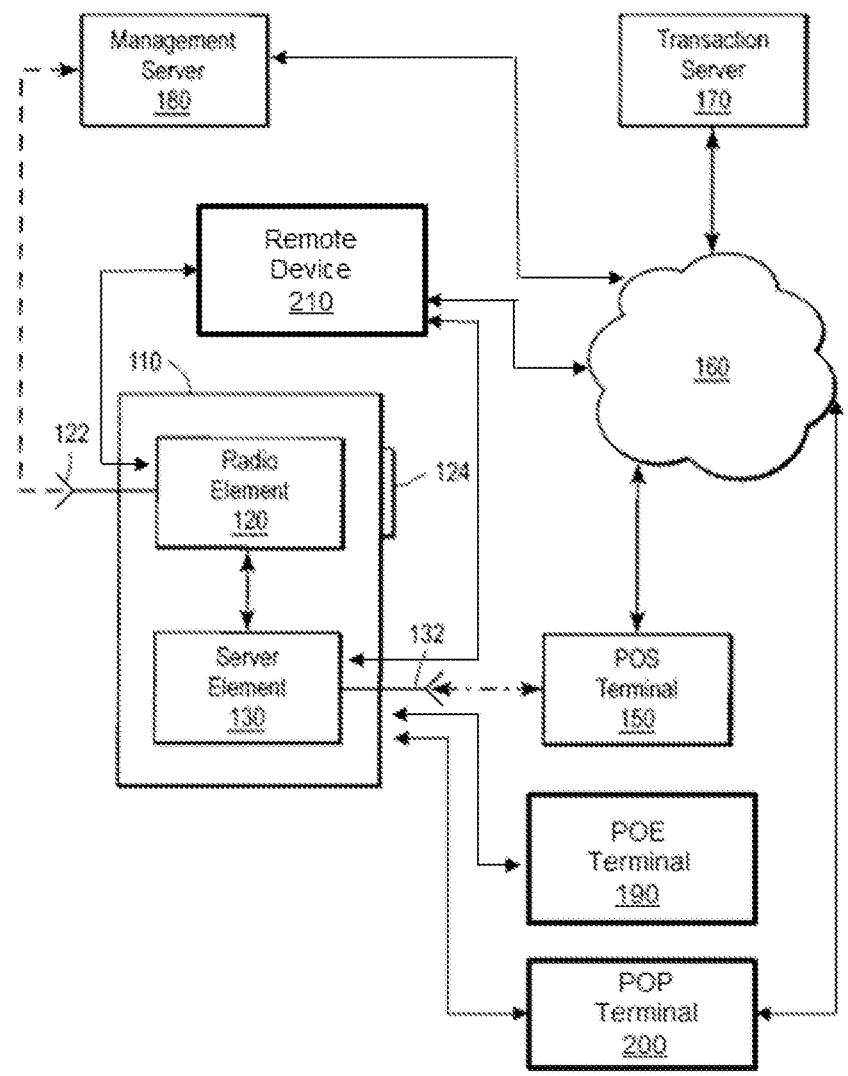
FIG. 1 is a block diagram illustrating a communication system in accordance with some embodiments.

FIG. 1 is a block diagram illustrating a communication system 100 in accordance with some embodiments. The communication system 100 includes a hand-held, wireless mobile communication device 110 with an antenna 120 for wireless communication. While the antenna 120 is shown as extending from the mobile communication device 110 for visual clarity, the antenna 120 may be implemented internally within the mobile communication device 110. Also, the mobile communication device 110 may include more than one antenna 120. The mobile communication device 110 includes a user interface for entering data. For example, a display 124 (FIG. 2) is a touch-screen display; alternatively or in addition, the mobile communication device 110 includes a keypad 125 (FIG. 2) for entering data.

A secure element 130 is physically coupled to the mobile communication device 110. In some embodiments, the secure element 130 is externally attached to the mobile communication device 110. For example, the secure element 130 is adhesively affixed or mechanically secured to the housing of the mobile communication device 110. Alternatively, the secure element 130 is housed within the mobile communication device 110. The secure element 130 includes an antenna 131 for wireless communication. While the antenna 131 is shown as extending from the secure element 130 for visual clarity, the antenna 131 may be implemented internally within the secure element 130. Also, the secure element 130 may include more than one antenna 131. Communication occurs wirelessly between the secure element 130 and the mobile communication device 110 via respective antennas 120 and 131, over a direct wireless channel 163 between the mobile communication device 110 and the secure element 130. Thus, in some embodiments, the channel 163 does not pass through a network.

The secure element 130 also can communicate wirelessly with different point-of-sale (POS) or point-of-entry (POE) terminals 150-1 to 150-N via the antenna 131. In some embodiments, a POS terminal 150 receives a transaction request signal from the secure element 130 and transmits the transaction request signal to a transaction server 170 over a network 160. Alternatively, a POE terminal 150 receives an entry request signal from the secure element 130 and transmits the entry request signal to the transaction server 170 over the network 160. The network 160 is any suitable wired and/or wireless network and may include, for example, a local area network (LAN), wide area network (WAN), virtual private network (VPN), the Internet, a metropolitan area network (MAN), or any combination of these or similar networks. The transaction server 170 verifies the request and forwards a verification signal to the management server 180 via the network 160. The management server 180 identifies the user corresponding to the verification signal and provides a response signal back to the mobile communication device 110, which the mobile communication device 110 receives via the antenna 120. The response signal thus is communicated back to the mobile communication device 110 using a communication channel that is different from the communication channel used to initiate the transaction. Alternatively, the response signal is communicated back to the mobile communication device 110 using communication channels from the management server 180 to the secure element 130 through the network 160 and POS terminal 150, and then from the secure element 130 to the mobile communication device 110 via the antennas 131 and 120.

In the example of an entry request signal received at a POE terminal 150, the entry request is verified by the POE terminal 150 or the transaction server 170, upon which the POE terminal 150 admits the user of the mobile communication device 110 to the corresponding venue or facility.

Figure 2:
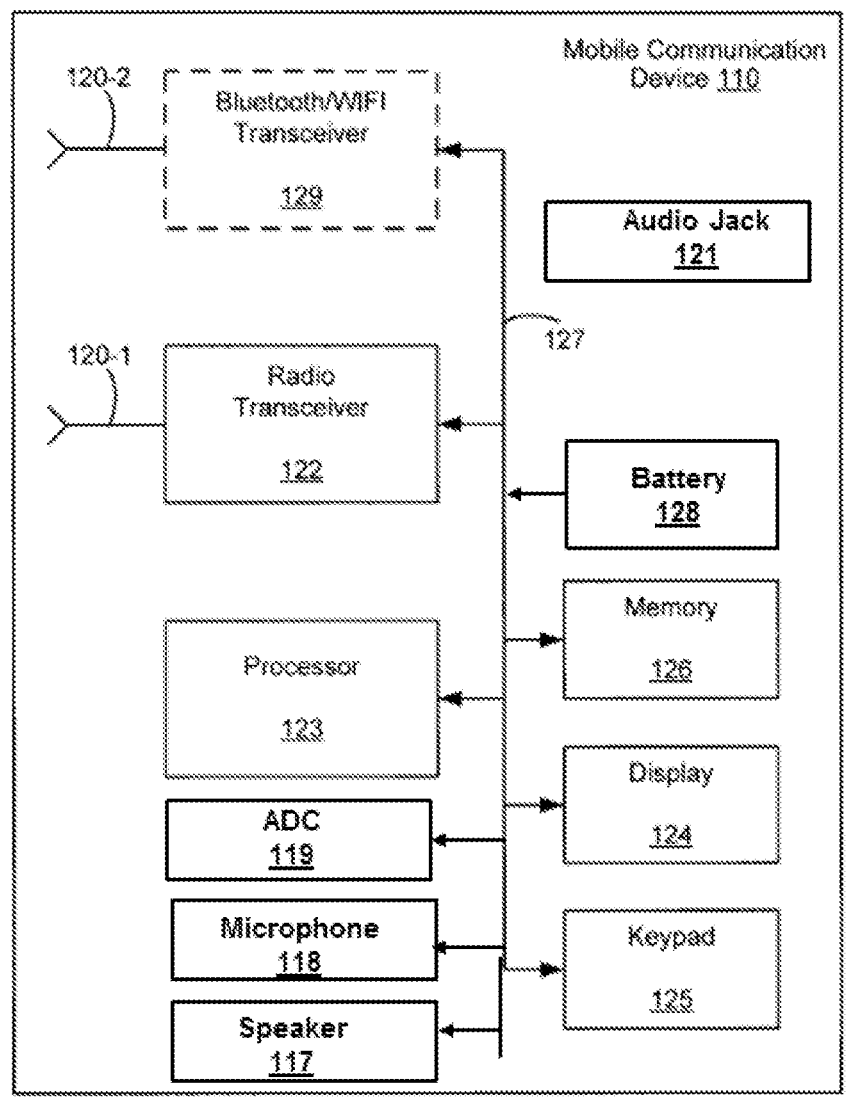
FIG. 2 is a block diagram illustrating selected elements of a mobile communication device in accordance with some embodiments.

FIG. 2 is a block diagram illustrating selected elements of the mobile communication device 110 in accordance with some embodiments. A processor 123 is coupled to a wireless radio transceiver 122, a display 124, a keypad 125, and a memory 126. The radio transceiver 122 is connected to an antenna 120-1, which is an example of an antenna 120 (FIG. 1) and is adapted to send outgoing voice and data signals and receive incoming voice and data signals over a radio communication channel The radio communication channel can be a digital radio communication channel (e.g., a cellular channel as provided by a cellular service provider), such as a CDMA or GSM channel. Such a radio communication channel has the capacity to communicate both voice and data messages using conventional techniques. In some embodiments, the processor 123 also is coupled to a second wireless transceiver 129 (e.g., a Bluetooth or WiFi transceiver), connected to a corresponding antenna 120-2 (which is another example of an antenna 120, FIG. 1), for communicating with an external device over an additional communication channel separate from the radio communication channel associated with the transceiver 122.

Figure 6:
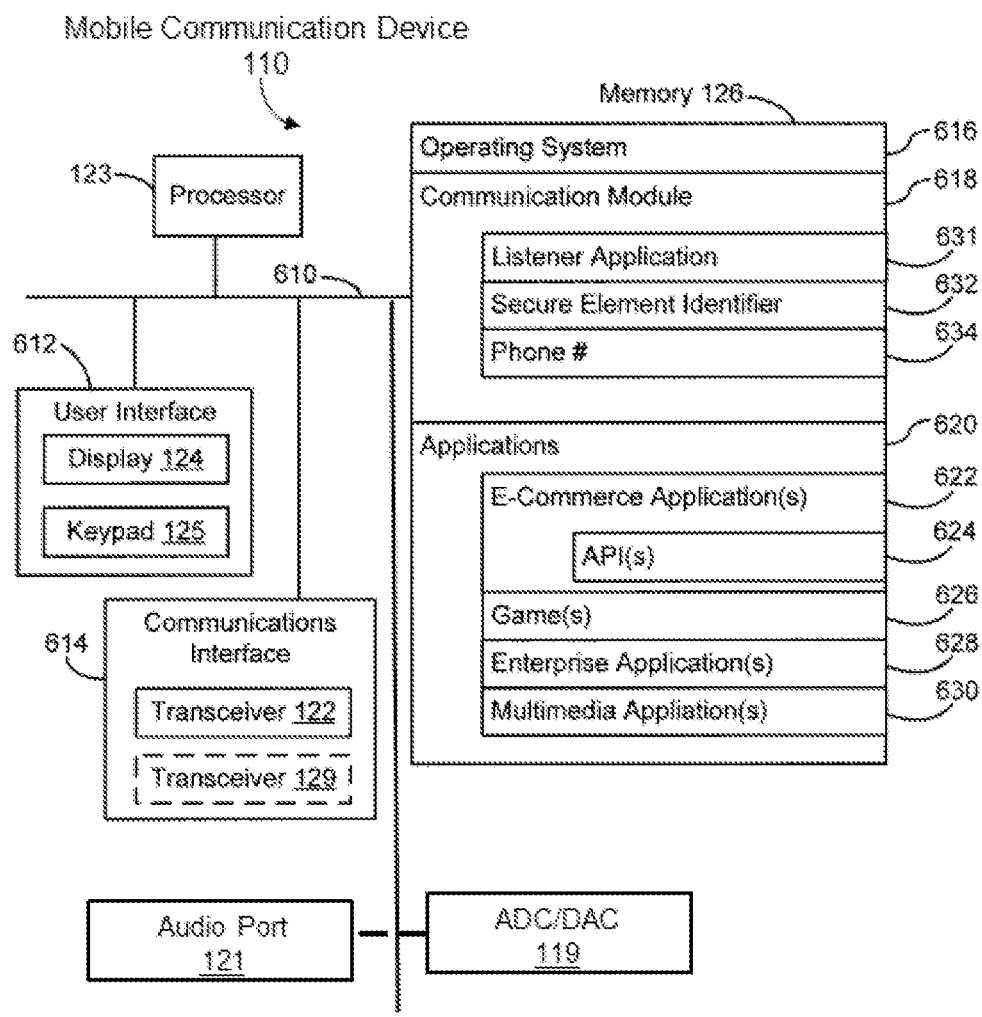
FIG. 6 is a block diagram illustrating selected elements of a mobile communication device in accordance with some embodiments.

The processor 123 has the capability to perform not only the radio communication services necessary to allow for phone and data communications (e.g., via the transceivers 122 and/or 129), but also to execute various application programs (e.g., applications 620, FIG. 6) that are stored in the memory 126. These application programs can receive inputs from the user via the display 124 and/or keypad 125. In some embodiments, application programs stored in the memory 126 and run on the processor 123 are, for example, iPhone, Android, Windows Mobile, BREW, J2ME, or other mobile applications and can encompass a broad array of application types. Examples of these applications include e-commerce applications 622 (FIG. 6), games 626 (FIG. 6), enterprise applications 628 (FIG. 6), and multimedia applications 630 (FIG. 6). E-commerce applications can include ticketing applications; content, item and service purchase applications; and/or payment management applications. One example of an e-commerce application that runs on the processor 123 and is stored in the memory 126 is an event application that provides event information and ticketing (e.g., for movies, concerts, sports, airplanes, busses, trains, etc). In some implementations, the processor 123 recognizes secure communications (e.g., as received via the transceiver 122 and/or 129) and transmits data from the secure communications to the secure element 130 for storage therein. The processor 123 also processes data received from the secure element 130.

Figure 3A:
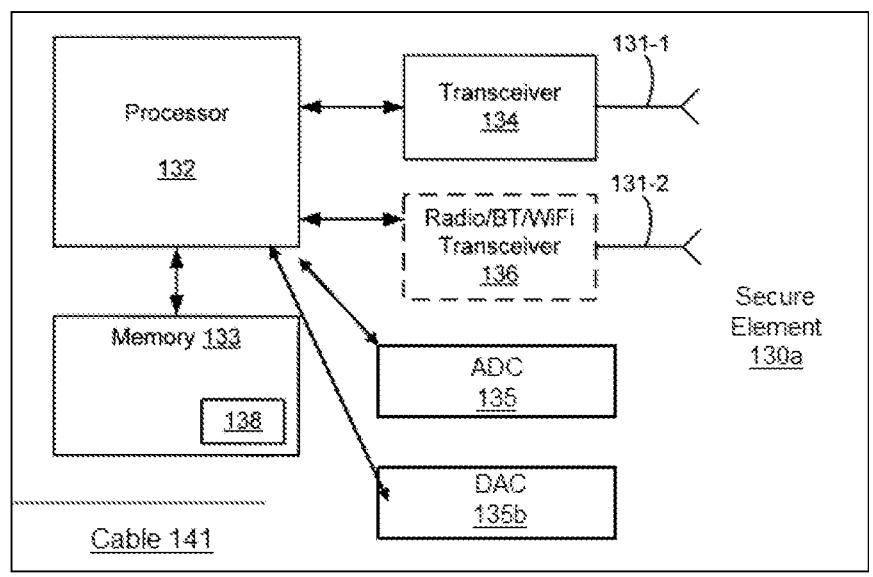
FIGS. 3A-3C are block diagrams illustrating a secure element to be physically coupled to a mobile communication device in accordance with some embodiments.

FIG. 3A is a block diagram illustrating a secure element 130*a* in accordance with some embodiments. The secure element 130*a*, which is an example of the secure element 130 (FIG. 1), includes a processor 132, a memory 133, and a wireless transceiver 134 with a corresponding antenna 131-1, a microphone 137, a speaker 139, and audio to digital converter 135, and audio cable 141 that has a 3.55 mm plug. The memory 133 includes a memory element 138 (e.g., a register, or alternatively a group of memory cells in a memory array in the memory 133) for storing an identifier (e.g., a serial number) associated with the secure element 130*a*. The memory element 138 is non-volatile and thus can store the identifier even in the absence of power. The transceiver 134 is adapted to communicate wirelessly with POS and POE terminals 150 (FIG. 1). For example, the transceiver 134 is adapted to send transaction request signals to POS terminals 150, to send entry request signals to POE terminals 150, and to receive corresponding responses from the terminals 150. In some embodiments, the transceiver 134 is a near-field communication (NFC) transceiver (e.g., operating in accordance with the ISO 18092 standard), which includes an NFC modem. In some implementations, the NFC modem has a set of registers that can be read and written by the processor 132 and are also available for reading and writing by an external device (e.g., a POS or POE terminal 150) over the wireless (e.g., RFID) communications channel between the transceiver 134 and the external device. This set of registers serves, for example, as a shared memory between the processor 132 within the secure element 130 and an RFID reader associated with a POS or POE terminal 150. This communication between the secure element 130*a* and POS or POE terminal 150 is performed, for example, in accordance with the ISO 14443A/B standard and/or the ISO 18092 standard.

In some embodiments, the secure element 130*a* includes one or more additional transceivers 136 (e.g., radio, Bluetooth, and/or WiFi transceivers) and associated antennas 131-2. The one or more additional transceivers 136 are adapted to communicate wirelessly with the mobile communication device 110 (e.g., via the transceiver 122 and/or 129 (FIG. 2) in the mobile communication device 110).

Figure 3B:
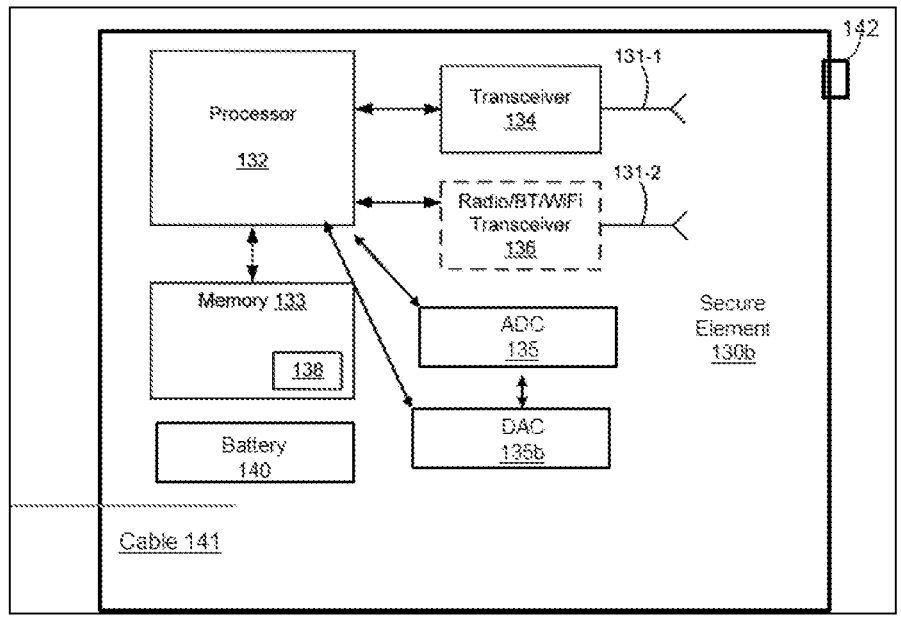

In some embodiments, the secure element 130*a* includes a second microphone (137), a second speaker (139), a second analog to digital converter (136), and a second battery as shown in FIG. 3b. These components are adapted to communicate wirelessly with the mobile communication device 110 (e.g., via the microphone 118 and/or speaker 117 (FIG. 2) in the mobile communication device 110).

The memory 133 stores one or more applications, including one or more e-commerce applications (e.g., applications 720, FIG. 7), to be executed by the processor 132. Associated with respective e-commerce applications are respective application programming interfaces (APIs) for interacting with corresponding applications run on the processor 123 in the mobile communication device 110 (FIG. 2) and with POS or POE terminals 150 (FIG. 1). Examples of such interactions are provided below with respect to FIGS. 4A-4D.

In some embodiments, the secure element 130, while physically coupled to the mobile communication device 110, is not electrically coupled to the device 110 and does not receive power from the device 110. Instead, for example, the secure element 130a receives RF power from a remote terminal (e.g., a POS or POE terminal 150) resulting from induction when in proximity to the remote terminal and uses this power to operate the processor 132, memory 133, and transceivers 134 and 136. In this scenario, the secure element can be embedded in the cell phone case which is affixed to the mobile communication device 110

In some embodiments, the secure element 130 is electronically coupled to the mobile communication devices and receives its power indirectly from the battery 128 within the mobile communication device. This is accomplished when the mobile wallet application which resides on the mobile communication sends an audio signal and thereby creating an electronic current over the cable 141 connected to the secure element which triggers induction and activates the secure element 130. In this scenario, if the secure element embedded in the cell phone case it can also be electrically coupled to the mobile communication device 110 through the analog cable 141 connecting the secure element to the mobile communication device analog port 121.

In the absence of another power source, the secure element 130a thus communicates with the mobile communication device 110 only when receiving power from a remote terminal. In some embodiments, a secure element 130b includes the components of the secure element 130a and also includes a battery 140, as shown in FIG. 3B. The battery can be charged using conventional methods such as an AC charger, solar charger, etc. Alternatively, the battery 140 is charged inductively (e.g., using a power harvester such as the power mat), which allows the battery 140 to be encased within the housing or body of the secure element 130b. In some embodiments, the battery 140 is surrounded by or encased in RF shielding to prevent interference between the battery 140 and the transceiver 134 or transceiver 136, in the secure element 130. In other embodiments the antennae is encased in RF shielding. In an alternative embodiment a thin RF shield is placed between the battery 140 and the transceiver 134 or transceiver 136 to prevent interference. The secure element 130b also may include one or more light-emitting diodes (LEDs) 142 to indicate a charge status of the battery 140.

Figure 3C:
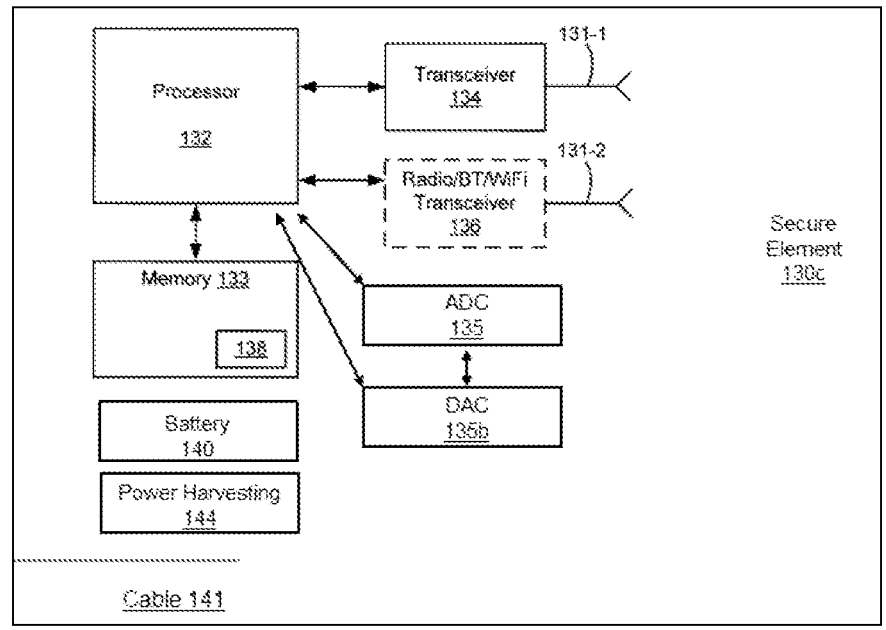
Figure 3C:
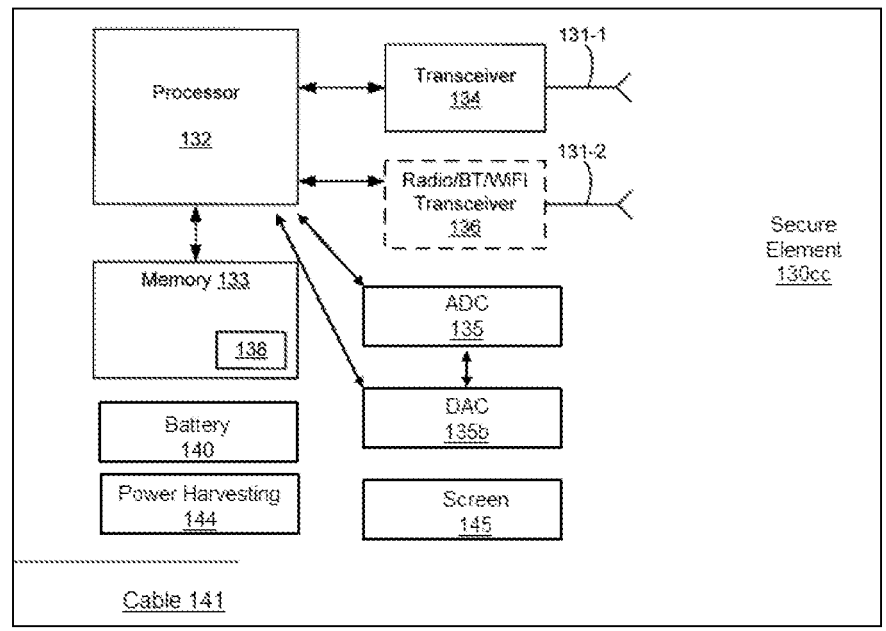

In other embodiments, a secure element 130c includes the components of the secure element 130a and also includes power harvesting circuitry 144, as shown in FIG. 3C. The power harvesting circuitry 144 harvests power from ambient radio-frequency (RF) signals from the mobile device battery or external sources around the mobile device and uses the harvested power to power the battery 140 other components of the secure element 130b. The power harvesting circuitry 144 can also harvest power generated during the near field communication interaction between the secure element and a remote POS or POE device. Thus, every time a user uses their NFC enabled mobile device with associated secure element for a NFC transaction, the power harvester utilizes the power to recharge the battery inside the secure element. In some embodiments, a secure element 130 includes both a battery 140 and power harvesting circuitry 144; the power harvesting circuitry 144 is used to recharge the battery. In FIGS. 3B and 3C, the power bussing between the battery 140 (FIG. 3B) or power harvesting circuitry 144 (FIG. 3C) and other components is not shown, for visual clarity.

In some embodiments, the components of the secure element 130a are implemented on a single integrated circuit (IC); this single integrated circuit is sometimes referred to as a smart chip. The smart chip and any other components (e.g., the battery 140, FIG. 3B, or power harvesting circuitry 144, FIG. 3C) of the secure element 130 are encased within a card, referred to as a smart card, that serves as a housing of the secure element 130. In some embodiments, the smart card is adhesively affixed to the mobile communication device 110 and is referred to as a sticker.

Figure 3D:
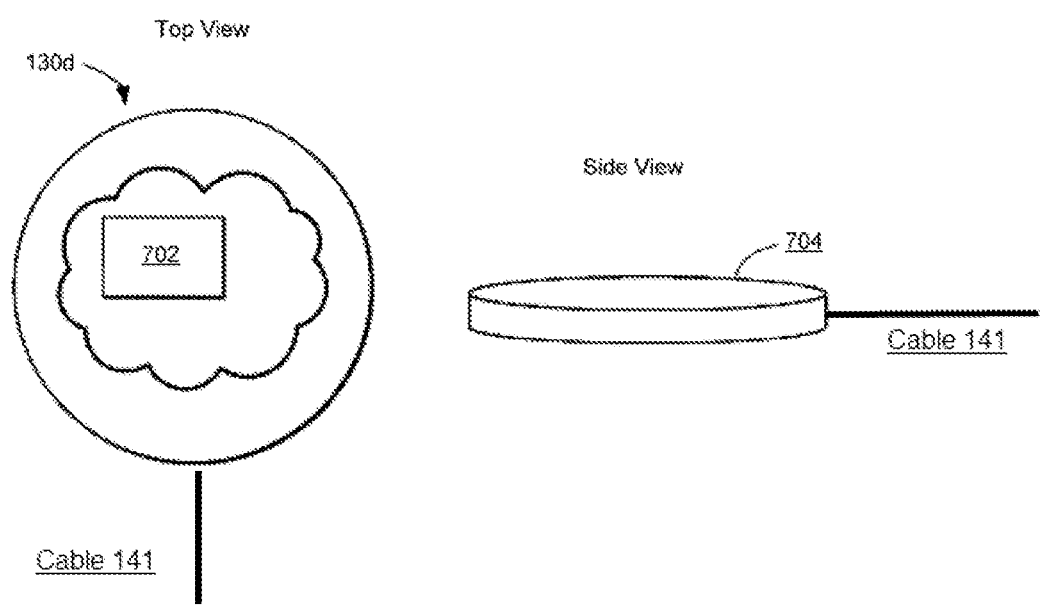
FIG. 3D illustrates top and side views of a smart card that can be attached externally to a mobile communication device in accordance with some embodiments.

FIG. 3D illustrates top and side views of a smart card 130d, which is an example of a secure element 130 (FIG. 1). The smart card 130d can be attached (e.g., affixed) externally to a mobile communication device 110. In FIG. 3D, the smart card 130d has a circular shape. The smart card 130d can have other suitable shapes (e.g., rectangular, triangular, and so on). The smart card 130d includes an embedded smart chip 702 that includes the components of the secure element 130a (FIG. 3A). The smart chip 702 is capable of 2-way wireless communication with a remote terminal (e.g., a POS or POE terminal 150) and with the mobile communication device 110 using the transceivers 134 or 136.

In some embodiments, the transceivers 134 and/or 136 in the smart chip 702 are low-power RF transceivers. Their low power output makes them susceptible to RF interference from neighboring devices, such as the mobile communication device 110 to which the smart card 130d is attached. Thus, in some implementations, the smart card 130d includes an RF shield to insulate the smart chip 702 from external interference. In one implementation, a lining of the smart chip 702 is composed of an RF absorbent material. In general, each phone has different levels of interference, and a material, size and thickness of the RF lining can determine an effectiveness of the RF shield. Alternatively, instead of incorporating an RF shield within the smart card 130d, an RF shield can be placed between the smart card 130d and the mobile communication device 110.

Given the abuse a mobile communication device 110 can take, smart cards 130d that are attached externally to a mobile communication device are designed to withstand some abuse. In some embodiments, the smart card 130d includes a ruggedized shell 704 that encases the smart chip 702. In some implementations, the shell 704 is formed of a composite plastic or polymer. The shell 70 can be hard (and substantially inflexible) or soft (and pliable). In some implementations, the shell 704 includes a protective membrane for the smart chip 702 which prevents damage to internal circuitry of the smart chip 702, a surface to adhere to an RF lining and/or the mobile communication device 110 with appropriate adhesive, and a surface that faces outward when the smart card 130d is attached to the mobile communication device 110, on which to print branding and advertising. Types of adhesives that can be used to affix the smart card 130d to the mobile communication device 110 include, for example, paper glue, super glue, adhesive polymers, and the like. In one implementation, the shell 704 has a maximum width (or diameter) of 25 mm, and has a maximum thickness (or depth) of 5 mm.

In some embodiments the shell can include a small screen 145 to show images stored in the secure element memory 133. The display 145 is depicted in FIG. 3CC. It is mounted to a controller board and displays images that are stored in the secure element memory 133. The mini screen 145 may be based on a Liquid Crystal Display (LCD). LCD can be a passive monochrome display such as a Super-Twisted Nematic display (STN), a passive color Super-Twisted Nematic display (CSTN), or an active color Twisted Nematic (TN). The LCD's vary in terms of power consumption, image quality, and response time. For example, while an STN requires less power than the TN, it has lower image quality and slower response time.

In a preferred embodiment, the screen 145 is based on a an Organic Light-Emitting Diode (OLED) which converts electricity to light. It does not require power when its inactive which makes it great for the secure element when it's not in use. Therefore, the screen 145 may not display any image when the secure element is not in use or in passive mode. Also, when it does use power, it uses power more efficiently than LCD. In fact, an OLED may only utilize 60-80% of the power of an LCD.

The images can be preinstalled in the memory, downloaded directly to the secure element 133 from a remote server, or downloaded to the mobile device and then transferred to the secure element memory 133. The images can be one or more logos representing financial institutions (e.g. Visa, MasterCard, American Express, Bank Of America, Citbank, etc) that have payment credentials stored in the secure element. Thus, the images serve as a branding opportunity for financial institutions. The images can change automatically based on which payment credential is active at any given time. For example, if the user elects to use their American Express card, the image will change automatically to be the American Express logo. The image will change if the user elects to use a different payment method. The user uses the mobile wallet to select which payment card they want to use. Upon doing so, using techniques described in previous patents referenced herein, the mobile wallet sends a notification to the secure element controller which executes the appropriate secure element application to change the status of the appropriate secure element payment application to active as well as changes the status of the corresponding image to active The images can be treated as advertisements and so the advertiser who pays for placement for a given time period, geographic location based on the users GPS coordinates, Advertisers can bid on placement of images on the secure element screen 145. The highest bidder will be able to display the image of their choice on the screen 145.

Users may elect to display a generic image that has no branding, Alternative, they may elect to display an image of their favorite sports team, celebrity, alumni, children, etc. The mobile wallet enables a user to select which image they want to display on the screen 145. The user can also purchase an image from a remote server and download it to the mobile device which then transfers it to the secure element memory for display on the screen 145. If a user does not select an image and there are no advertisements, the secure element displays a default image on the screen 145. If the secure element is embedded in a cell phone case, the image is displayed through the case if the cell phone case is clear or through a window/opening in the cell phone case.

The display 145 may show 1 or more images and size them appropriately. For example, if there is only 1 image, it will be displayed in the center of the screen. In another example if there are 2 images, they may be positioned side by side next to each other or stacked vertically on top of each other. The API in the secure element will determine how to dynamically rotate the images and/or resize them to fit the screen.

Figure 3E:
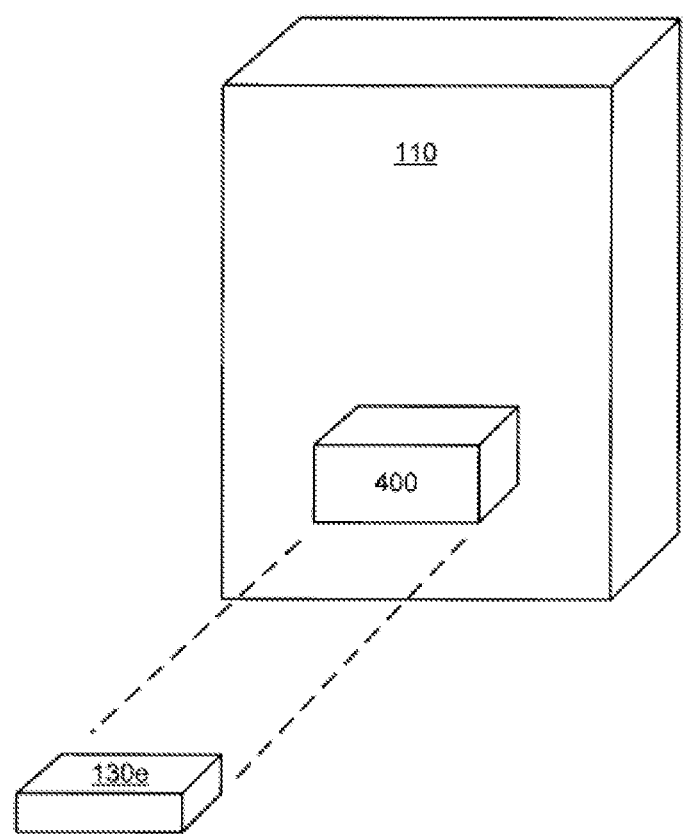
FIG. 3E illustrates a mobile communication device with a slot for receiving a secure element in accordance with some embodiments.

In some embodiments, instead of being externally attached to the mobile communication device 110, a secure element 130 is physically coupled to the mobile communication device 110 by being disposed internally within a body of the mobile communication device 110. For example, as shown in FIG. 3E in accordance with some embodiments, the mobile communication device 110 includes a slot 400 into which a secure element 130e is inserted. The secure element 130e is an example of a secure element 130a, 130b, or 130c (FIGS. 3A-3C). Even though the secure element 130e is physically housed within the slot 400, the secure element 130e and the mobile communication device 110 still communicate wirelessly with each other. Accordingly, in some implementations the slot 400 only provides for physical insertion and mechanical connection of the secure element 130e to the body of the mobile communication device 110, and does not electrically couple the secure element 130e to the mobile communication device 110.

Attention is now directed to methods of communication between various elements of the system 100 (FIG. 1), including the mobile communication device 110 and the secure element 130. FIGS. 4A through 4D illustrate examples of transactions involving the mobile communication device 110, the secure element 130, and other elements of the system 100.

Figure 4A:
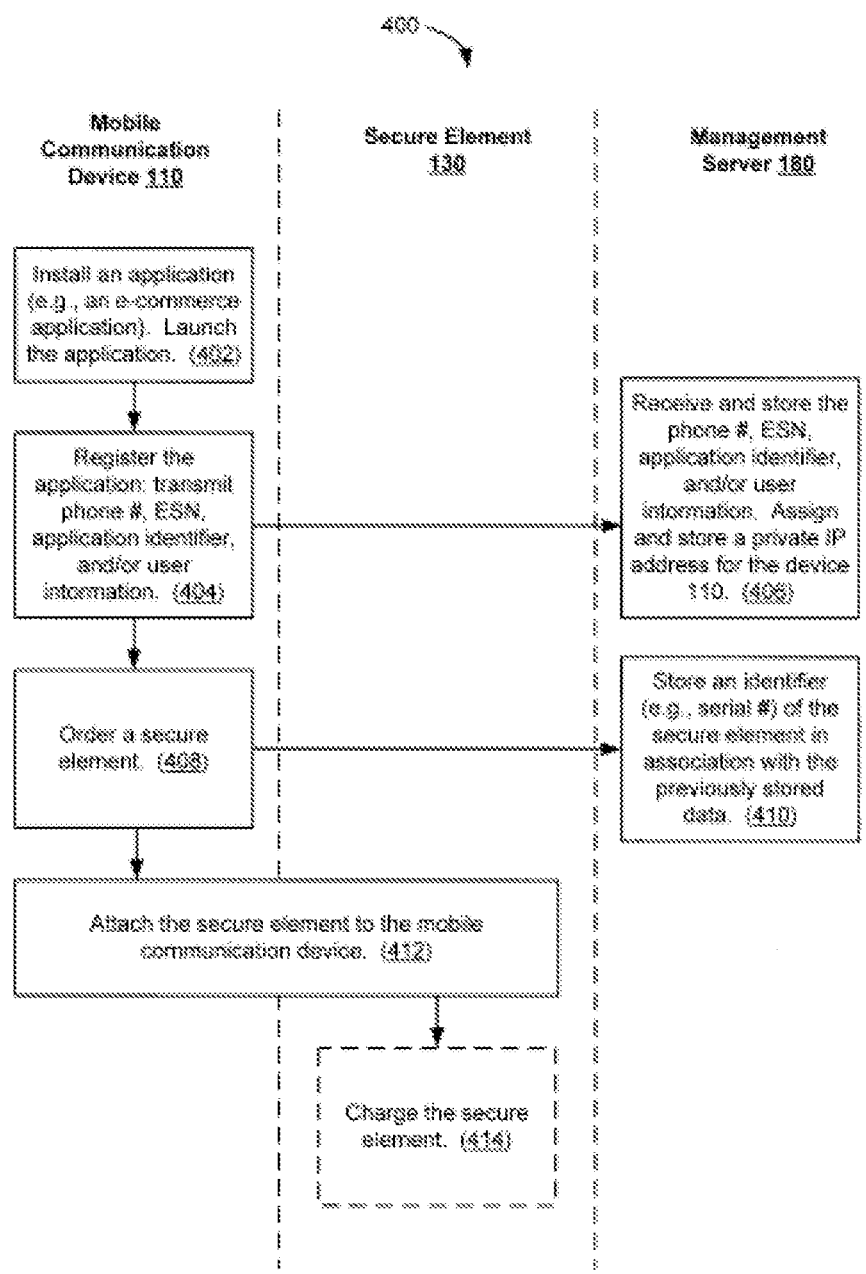
FIG. 4A is a flow diagram illustrating a method of installing a secure element in accordance with some embodiments.

Various operations shown in FIGS. 4A-4D, including operations 420 (FIG. 4B), 440 (FIG. 4C), 460 (FIG. 4D), and 480 (FIG. 4D), involving sending messages from the secure element 130 to the mobile communication device 110. FIG. 4A is a flow diagram illustrating a method 400 of installing a secure element 130 in accordance with some embodiments. In the method 400, an application (e.g., an application 620, such as an e-commerce application 622, FIG. 6) is installed (402) on the mobile communication device 110 by storing the application in the memory 126 (FIG. 2). The application is launched (402), thus initiating execution of the application by the processor 123 (FIG. 2). The user of the application registers (404) the application. In response to an instruction to register the application, the application transmits to the management server 180 (FIG. 1) the phone number and electronic serial number (ESN) of the mobile communication device 110, along with an identifier of the application and/or user information. This information is transmitted, for example, in one or more packets addressed to the management server 180, as created by the processor 123 and transmitted via the transceiver 122 or 129 (FIG. 2). The management server 180 receives and stores (406) this information. In some embodiments, the management server 180 also assigns a sampling rate for the secure element analog to digital converter 135 and digital to analog converter 135b in order to optimize performance, memory limitations, etc. 130. This sampling rate is downloaded directly to the secure element 130 or downloaded to the mobile device which then transfers it to the secure element 130. The user orders (408) a secure element 130. The order is placed, for example, using the application. The management server 180 stores (410) an identifier of the secure element 130 to be provided to the user. For example, the management server 180 stores (410) a serial number of a smart chip 702 (FIG. 3D) in a smart card 130d to be provided to the user. Alternatively, the user obtains the secure element 130 and enters a code printed on the secure element 130 into the application, which transmits the code to the management server 180, where it is stored. The management server 180 uses the registration information to look up information about the mobile device (e.g., microphone width).

Upon receiving the secure element 130, the user attaches (412) the secure element 130 to the mobile communication device 110. The secure element 130 should be placed so that the cable 141 connected to the secure element 130 is closest to the edge of the device 110 and facing in the direction of the audio port 121 of the mobile communication device 110 for optimal performance. For example, the user affixes a smart card 130d (FIG. 3D) to the mobile communication device 110. In another example, the user inserts a secure element 130e (FIG. 3E) into a slot 400 in the mobile communication device 110. If the secure element 130 includes a battery 140 (FIG. 3B), the battery 140, and thus the secure element 130, is charged (414). If the secure element is embedded into the cell phone case, the user affixes the cell phone case to the mobile communication device 110. After the secure element 130 has been installed in accordance with the method 400, the secure element 130 is activated.

Figure 4B:
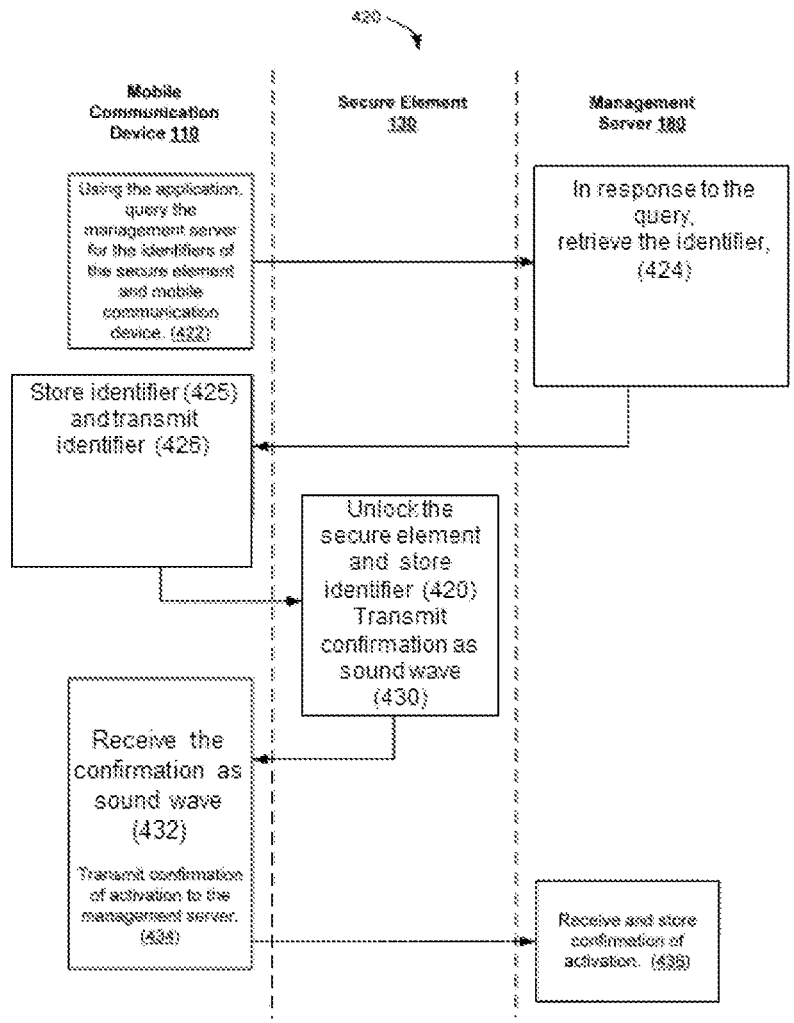
FIG. 4B is a flow diagram illustrating a method of activating a secure element in accordance with some embodiments.

FIG. 4B is a flow diagram illustrating a method 420 of activating a secure element 130 in accordance with some embodiments. In the method 420, the user uses the application running on the processor 123 (FIG. 2) to query (422) the management server 180 for the identifier of the secure element 130 and, in some embodiments, the mobile communication device 110. In response, the management server 180 retrieves the stored (424) and other information and transmits them to the mobile communication device 110. The mobile communication device 110 stores (425) the identifier. The mobile communication device formulates a packet with a message for the secure element to turn on the internal processor 133. The mobile communication device transmits a low voltage signal using the cable 147 to the secure element 110 to activate it by induction and transmits (426) the identifier for the secure element to the secure element 130. The secure element receives the information (420) and stores it in its memory. The secure element creates an analog sound wave with a message confirming receipt of information and transmits confirmation (430) to the device 110. The device 110 receives confirmation (432) and sends a copy to the management server (434)

Figure 4C:
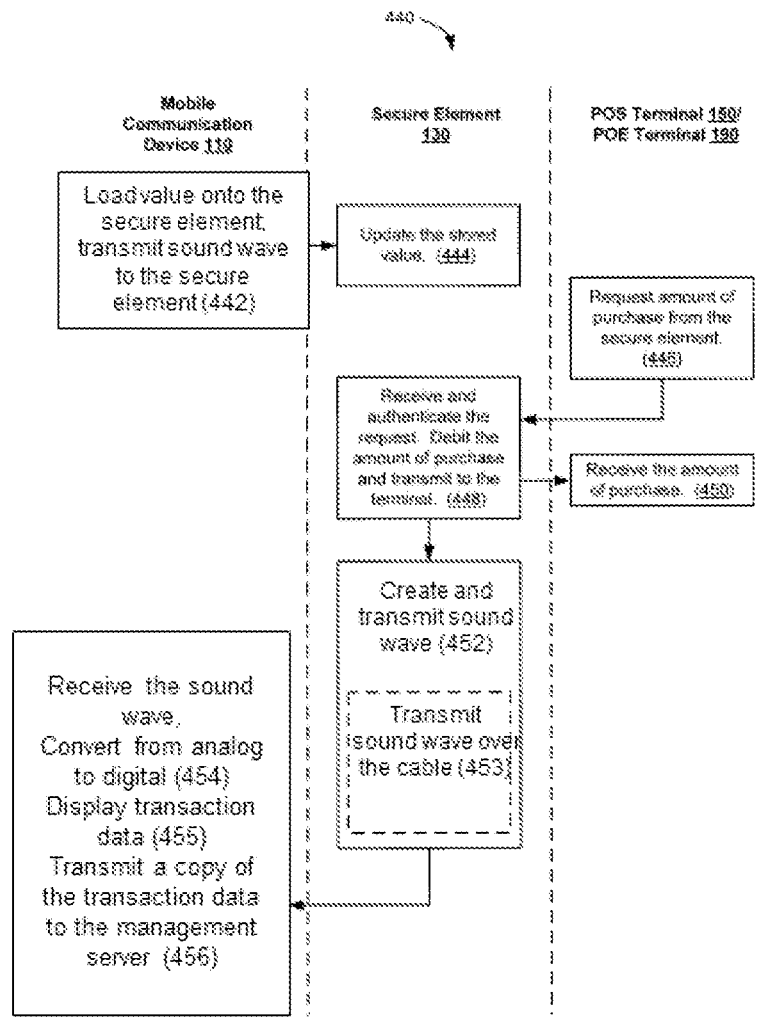
FIG. 4C is a flow diagram illustrating a method of using a secure element for a purchase in accordance with some embodiments.

Once the secure element 130 has been activated and its activation confirmed in accordance with the method 420, the secure element 130 may be used for purchases at terminals such as a POS or POE terminal 150 (FIG. 1). FIG. 4C is a flow diagram illustrating a method 440 of using a secure element 130 for a purchase in accordance with some embodiments.

In the method 440, the user instructs an application running on the processor 123 (FIG. 2) of the mobile communication device 110 to load (442) value (e.g., money or credits) onto the secure element 130. An application (or corresponding API) running on the processor 132 (FIGS. 3A-3C) updates (444) the stored value of the secure element 130 by the amount specified in the message. The application creates a digital message, specifying the value to be loaded onto the secure element 130, converts it to an analog sound wave at 300 MHz using ADC 119 (or the appropriate sampling rate to ensure that there is sufficient memory available to store the data in the secure element memory 133) (452) and transmits (454) the sound wave using the analog cable 141 to the secure element 130. The secure element 130 receives (456) the sound waves via the analog cable 141 (FIGS. 3A-3C), converts it to digital using ADC 135, and displays the data to the user in the mobile wallet. In some embodiments, the secure element 130 transmits a confirmation message (not shown) to the mobile communication device 110. If the mobile communication device 110 does not receive the confirmation message from the secure element 130, it retransmits the sound waves as described in operation 442.

To purchase an item or gain entry to a venue or facility, the user brings the mobile communication device 110 with its attached secure element 130 into proximity with a POS or POE terminal 150. The terminal 150 requests (446) the amount of purchase (or entry) from the secure element 130. The secure element 130 receives this request directly from the terminal 150 via the transceiver 134 (or alternatively, 136). After authenticating the request, the secure element 130 debits its stored value by the requested amount and transmits (448) the requested amount to the terminal 150, which receives (450) the amount.

Leveraging the power that results from induction by holding the secure element 130 in proximity to the POS/POE, an application (or corresponding API) running on the processor 132 (FIGS. 3A-3C) of the secure element 130 creates a digital message with transaction data for the purchase (e.g., the amount, the date and time, identification of the terminal 150, etc.), converts the digital message to analog using the DAC 135, and transmits the sound waves (453) by cable 141 (FIGS. 3A-3C) to the mobile communication device 110.

The mobile communication device 110 receives the sound waves. When it receives (454) the sound waves, it converts it to digital using DAC 119. It displays (455) the transaction data contained in the message to the user. The device 110 transmits (456) a copy of the transaction data to the management server 180 (not shown in FIG. 4C), which stores the transaction data. The device also sends a confirmation that it received the messages to the secure element 130.

Figure 4D:
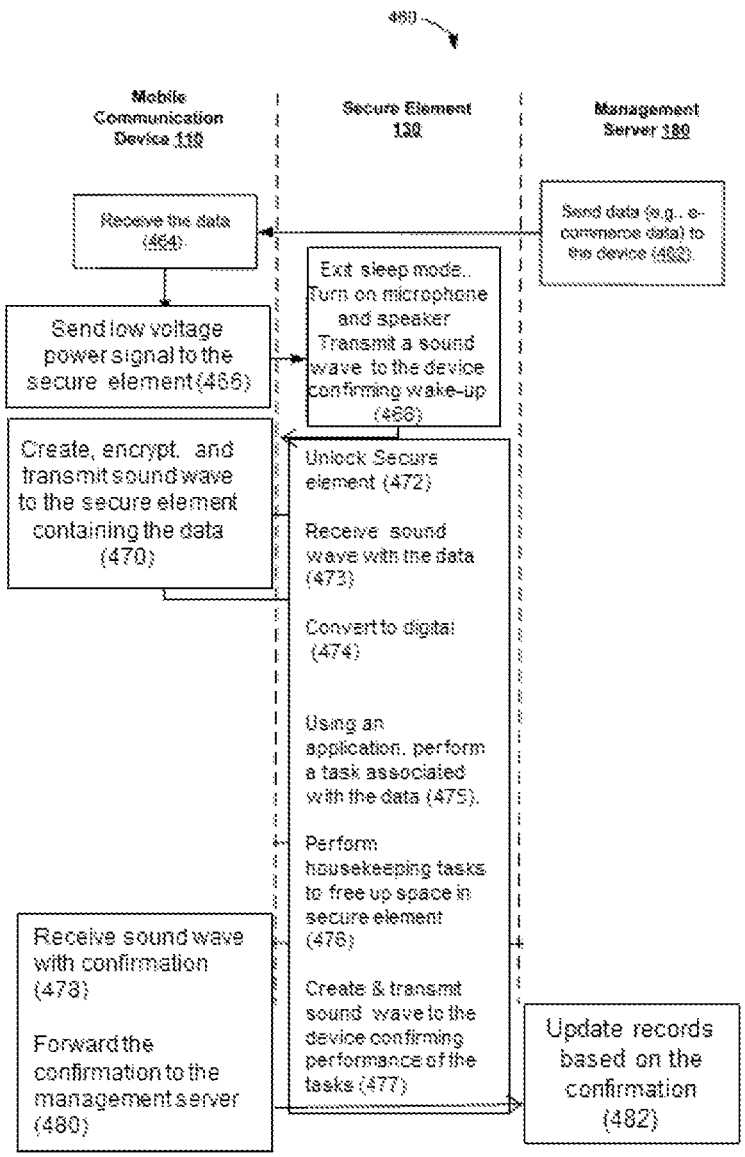
FIG. 4D is a flow diagram illustrating a method of transmitting e-commerce data to a secure element in accordance with some embodiments.

The method 440 of FIG. 4C thus illustrates a purchase performed using the device 110 and secure element 130. In some embodiments, data is provided to the secure element 130 for subsequent use or reference in a transaction such as the purchase of the method 440. FIG. 4D is a flow diagram illustrating a method 460 of providing data to a secure element 130 in accordance with some embodiments.

In the method 460, the management server 180 sends (462) data to the mobile communication device 110, which receives (464) the data. In some embodiments, the data is e-commerce data (e.g., a ticket, such as a ticket for a movie, concert, sporting event, airplane, bus, train, etc; a new value for a stored value card, credit card, or debit card; a coupon; or an advertisement). If the data includes a coupon, the coupon may include a merchant ID, promotion code, date of coupon delivery, time of coupon delivery, GPS coordinates associated with coupon delivery, etc. Other examples of the data include, but are not limited to, locations of smart posters; a code to unlock a door, computer, or vehicle; a code to start a vehicle, start a copy machine, withdraw funds from an ATM, or release medical records to a specific person or device; a list of authorized cell phone numbers, IMEI numbers, and/or serial numbers associated with secure elements for peer-to-peer funds transfer, or an instruction to disable the secure element 130 if the mobile device 110 has been reported as lost or stolen. The device 110 receives the data, for example, over a cellular network, via the transceiver 122, or over an Internet connection, via the transceiver 129. Instead of immediately forwarding the received data to the secure element 130, an API in the device 110 first transmits (466) a low voltage signal over the cable 141 to the secure element 130 to activate the secure element 130.

The secure element 130 receives the signal over the cable 141 and is activated 136 (FIGS. 3A-3C) and, in response, exits sleep mode. The processor 132 (FIGS. 3A-3C) creates a message (e.g., sound wave) confirming that the device has exited sleep mode and thus woken up. The message is transmitted (468) via the cable 141.

The mobile communication device 110 receives the sound wave via the cable 141 (FIG. 2). In response, the processor 123 (FIG. 2) creates (470) sound wave containing the data received in the operation 464. The sound waves are transmitted to the secure element 130 via the cable 141 (FIG. 2).

The secure element 130 is unlocked (472) and then receives (473) the sound wave containing the data via the cable (FIGS. 3A-3C), converts the sound wave from analog to a digital message using ADC 135 (474).

Using an application (e.g., an e-commerce application) or corresponding API running on the processor 132 (FIGS. 3A-3C), the secure element 130 performs (475) a task associated with the received data. For example, the data are stored in the memory 133. If the data contain an instruction to disable the secure element 130, the secure element 130 disables itself, thus preventing the secure element from being able to interact with a remote terminal (e.g., a POS or POE terminal 150). If the data contain a ticket (e.g., for a movie, concert, sports, airplane, bus, train, etc.) or coupon, the secure element 130 stores the ticket or coupon in the memory 133 which can be subsequently redeemed at a POS or POE terminal 150, even if the mobile communication device 110 does not have network access and thus is offline. If the data contain instructions to increase or decrease the value of a stored value account, debit card, or credit card, the value as stored in the memory 133 is increased or decreased accordingly. If the data contain updates to information about a financial account (e.g. expiration date, billing address, etc), the information is updated in the memory 133. If the data include one or more user-defined payment limits, an e-commerce application on the secure element 130 uses the payment limits to prevent transactions above the limits or to require entry of a PIN code to authorize transactions above the limits. If the data include a list of authorized cell phone numbers, IMEI numbers, and/or serial numbers associated with secure elements that are authorized for peer-to-peer transactions (e.g., funds transfers), the secure element 130 stores the list in the memory 133 and subsequently uses the list to perform peer-to-peer transactions with other secure-element-equipped mobile communications devices that are placed in proximity to the device 110. If the data include a access code (e.g., to provide access to a building, office, apartment, room, vehicle, safety deposit box, etc.), the secure element 130 stores the access code in the memory 133 and subsequently provides the access code to a POE terminal 150 to request access. If the data includes a code to operate an apparatus (e.g., a vehicle or electronic appliance such as a computer, copy machine, washing machine, ATM machine etc), the secure element 130 stores the code in the memory 133 and subsequently provides the code to a remote terminal associated with the apparatus to initiate use of the apparatus. If the data includes a code to provide access to computerized records (e.g., medical records), the secure element 130 stores the code in the memory 133 and subsequently provides the code to a computer to request access to the records. If the data is an image, the image is displayed on the miniature screen 145.

Figure 5:
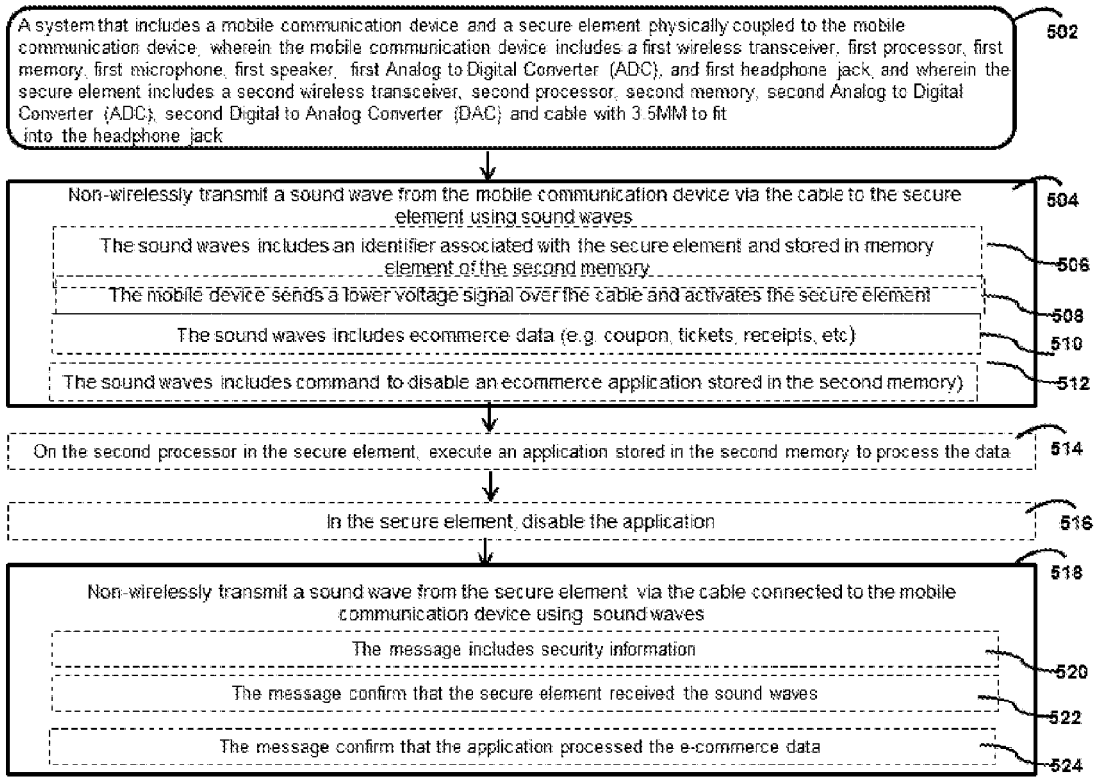
FIG. 5 is a flow diagram illustrating a method of communicating between a mobile communication device and a secure element in accordance with some embodiments.

The secure element performs any housekeeping tasks (476) including checking the available memory capacity. If the memory capacity is less than 50%, the API will delete other ecommerce data (i.e. tickets, coupons, etc) with status equal to redeemed, expired, etc. The secure element creates and transmits (477) a message (i.e. sound wave) to the mobile communication device 110 confirming that the task has been performed. The device 110 receives (478) sound waves via the cable 141 (FIG. 2) and forwards (480) the confirmation to the management server 180, which updates (482) its records accordingly FIGS. 4A-4D provide specific examples of how to use a mobile communication device 110 and associated secure element 130. Attention is now directed to a more generalized method of communication between a mobile communication device 110 and a secure element 130 that is physically coupled to the device 110. Specifically, FIG. 5 is a flow diagram illustrating a method 500 of communicating between a mobile communication device 110 and a secure element 130 in accordance with some embodiments.

The method 500 is performed at a system that includes a mobile communication device 110 and a secure element 130 physically coupled to the mobile communication device 110. The mobile communication device 110 includes a first wireless transceiver (e.g., the transceiver 122, FIG. 2), first processor (e.g., the processor 123, FIG. 2), first memory (e.g., the memory 126, FIG. 2), first speaker (e.g., the speaker 117, FIG. 2), first microphone (e.g., the microphone 118, FIG. 2), first Analog to Digital Converter ADC (e.g., the ADC 119, FIG. 2), and first audio port (e.g. The audio port 121, FIG. 2). In some embodiments, the mobile communication device 110 includes a plurality of transceivers (e.g., the transceivers 122 and 129, FIG. 2). The secure element 130 includes a second wireless transceiver (e.g., the transceiver 134 or 136, FIGS. 3A-3C), second processor (e.g., the processor 132, FIGS. 3A-3C), second memory (e.g., the memory 133, FIGS. 3A-3C), second Analog to Digital Converter ADC (e.g., the ADC 135, FIGS. 3A-3C), second Digital to Analog Converter DAC (e.g., the ADC 135$b$, FIGS. 3A-3C), and cable (e.g. The cable 141, FIGS. 3A-3C). In some embodiments, the secure element 130 includes a plurality of transceivers (e.g., the transceivers 134 and 136, FIGS. 3A-3C).

Examples of data transmitted in the operation 504 include the data transmitted in the operations 426 (FIG. 4B), 442 (FIG. 4C), 466 (FIG. 4D), and 470 (FIG. 4D)

In some embodiments, the sound wave has instructions including (512) a command to disable an application (e.g., an application 720, such as an e-commerce application) stored in the second memory (e.g., as described with respect to the operation 470, FIG. 4D). In response, the application is disabled (516) in the secure element 130 (e.g., in the operation 474, FIG. 4D).

The secure element 130 receives sound waves via the cable (e.g., 141, FIGS. 3A-3C). In some embodiments, prior to the operation 504, the secure element is unlocked using methods described in previous patents reference herein. The DAC 119 converts digital signal to an analog sound wave using the recommended frequency stored in memory in the device 110 with sigma delta conversion.

If the secure element is successfully unlocked, an application/API in the secure element formulates a message to the device 110 that the message has been received and is authentic. The DAC 135$b$ converts the message from digital to analog at 300 Mhz (or whatever sampling rate to keep the storage below the available secure element memory 133) using sigma-delta and transmits it to the device 110.

If the secure element is not successfully unlocked, the application/API in the secure element creates an encrypts a message with the mobile device 10 digit number or wallet ID, transaction number, date, time, etc The ADC 135 converts the message from digital to analog at 300 Mhz (or whatever sampling rate to keep the storage below the available secure element memory 133) using sigma-delta and transmits it to the device 110. The device 110 receives the signal via the cable 141, converts it to digital, stores it in memory The API also displays a message to the user to contact the help desk and/or customer care center associated with the service provider. If the secure element 130 does not acknowledge the receipt of the first message, the device 110 will resend the message a predetermined number of times until it receives an acknowledgement. If it does not receive an acknowledgment, the secure element 130 will compose a message with the date, time, and transaction number, and error code/description. When it has connectivity with the device 110, it will transmit this message to the device 110 which will send a copy to the management server180.

In some embodiments, if the secure element processor is asleep or not in active mode prior to data transmission, an API in the device 110 formulates a packet with a message for the secure element 130 to activate the processor, sends a low voltage signal (508) over the cable 141 to the secure element to activate the secure element, and sends the packet to the receiver 134 or 136.

In an alternative embodiment, the user can "wake up" the secure element by holding it in proximity to any NFC enabled deice that is in active mode such as a computer, laptop, electronic notebook, monitor, laptop, key ring, watch, business card.

In some embodiments, the sound waves include (510) data (e.g., e-commerce data). Examples of data included in the sound waves include those data described with respect to operations 470 and 472 in the method 460 (FIG. 4D). An application stored in the second memory is executed (514) on the second processor in the secure element 130 to process the data (e.g., as in the operation 474, FIG. 4D). The message confirms (524) that the application processed the data (e.g., as in the operation 476, FIG. 4D).

A message is non-wirelessly transmitted (518) over the cable 141 from the secure element 130 to the mobile communication device 110, using sound waves. The sound waves are transferred at 10 Mhz for example.

Examples of messages transmitted in the operation 518 include the messages transmitted in the operations 420 (FIG. 4B), 4440 (FIG. 4C), 460 (FIG. 4D), and 480 (FIG. 4D).

In some embodiments, the message confirms (522) that the secure element received the sound wave In some embodiments, prior to the operation 518, the secure element 130 may need to be unlocked prior to storing artifacts in the secure element memory or executing programs running in the secure element.

If the mobile wallet application on the mobile device 110 is already open, the mobile communication device receives the analog sound wave from the secure element over the cable 141. The ADC 119 converts the analog signal to digital. The digital message is stored in memory.

If the message is authentic, API formulates a message to the secure element 130 that the message has been received. The DAC 135*b* converts the message from digital to analog at 300 Mhz (or the appropriate sampling rate to ensure the encoded information can be stored in the secure element memory based on the available secure element memory) using sigma-delta and transmits it to the secure element 130. The API then performs any necessary action on the ecommerce data such as deleting relevant commerce data (e.g. deletes ticket or coupon if ticket or coupon was transferred to the device 110). API in the secure element 130 checks the available memory capacity. If the memory capacity is less than 50%, the API will delete other ecommerce data with status equal to redeemed, expired. An API in the secure element creates a message confirming performance of these tasks. The ADC 135 converts digital message to sound at 300 Mhz (or whatever sampling rate will keep the storage below the available memory in the secure element memory) using sigma-delta, and transmits it to the device 110. After receiving an acknowledgement back from the device 110, the API then sets the switch to the internal battery 140 to "sleep mode" so as to minimize interference between the internal battery 140 and battery associated with a POS/POE during near field communication induction.

If the wallet API in the device 110 is not activated or open, the user will have to open it. Once the user selects an action to perform (e.g. view account balance and receipt data), the wallet API in the device will formulate a request for the appropriate action (e.g. get data for the selected account), send a low power signal to the secure element 141 over the cable 141 which activates the secure element, and send the request over the cable using sound waves to the secure element 130. After receiving the signal the API in the secure element 130 will formulate the message with the ecommerce data, convert it to sound waves using ADC 135, encrypt it, and transmit it over the cable 141 to the mobile communication device 141. If the wallet API on the device 110 has not received the request in the time in a certain amount of predetermined time, the wallet API in the mobile communication device 110 will send another request to the secure element 130. If the requests and data transmission are successful, an API in the secure element 130 will turn off processor inside the secure element.

If the secure element 130 does not receive acknowledgment of its original message, it will resend the request a predetermined number of times. If it does not receive an acknowledgment, the secure element 130 creates a message with the secure element serial number, date, time, error message, etc), stores the message until it can be transmitted to the device 110 which sends a copy to the management server 180.

In some embodiments, the message provides transaction data (e.g., as in the operation 452, FIG. 4C). The transaction data are associated with an e-commerce or other transaction. For example, the message provides a receipt from an e-commerce transaction; the receipt includes, for example, a transaction number, transaction amount, transaction date, transaction time, merchant ID, merchant name, product id, product name, location of transaction/merchant, and/or cashier ID. In another example, the message provides an indication of redemption of an electronic coupon. Other examples of transaction data include date, time, amount, and identifier of other secure element from a peer-to-peer funds transfer resulting from holding 2 secure elements in close proximity; a virtual hotel key if the customer checks into a hotel; date, time, and GPS locations associated with unlocking the door of a vehicle, office, home, apartment, or other building; date, time, and GPS location of receiving a coupon from a smart poster or merchant as well as coupon details; date, time, location, physician name, and key information from a doctor visit, medical exam, medical tests, hospital visit; date, time, GPS location of ATM machine, amount of withdrawal, etc are described with respect to operations 470-478 in the method 460 (FIG. 4D).

The mobile communication device 110 receives the message via the first transceiver (e.g., transceiver 122, FIGS. 3A-3C), or alternatively via another transceiver distinct from the first transceiver (e.g., transceiver 129, FIGS. 3A-3C). In some embodiments, the device 110 receives messages from a cellular service provider (e.g., forward by the cellular service provider but initially transmitted by another party) at a first port, and receives the message from the secure element 130 at a second port distinct from the first port.

In some embodiments, the secure element 130 receives power from a remote terminal (e.g., a POS or POE terminal 150, FIG. 1). For example, the secure element 130 receives power via RF signals transmitted by the remote terminal. The wireless transmission of the message in operation 518 is performed using the power received from the remote terminal when the secure element 130 is in proximity to the remote terminal. In other embodiments, the secure element 130 harvests power from ambient RF signals (e.g., using power harvesting circuitry 144, FIG. 3C) from the battery located in the mobile device, external sources, or even the power created during near field communication induction. The wireless transmission of the message in operation 518 is performed using the harvested power. In still other embodiments, the secure element 130 includes a battery (e.g., a battery 140, FIG. 3B), and the wireless transmission of the message in operation 518 is performed using power from the battery. For example, the secure element 130 determines whether power is available from a nearby remote terminal. If power is not available from the nearby terminal, the message is wirelessly transmitted using power from the battery.

The method 500 thus allows for non-wireless bi-directional communication between a mobile communication device 110 and associated secure element 130 using a cable 141 to send sound wave in both directions. While the method 500 includes a number of operations that appear to occur in a specific order, it should be apparent that the method 500 can include more or fewer operations, which can be executed serially or in parallel. An order of two or more operations may be changed and two or more operations may be combined into a single operation. For example, the order of the operations 504 and 518 may be reversed.

FIG. 6 is a block diagram illustrating a mobile communication device 110 (e.g., as shown in FIG. 2) in accordance with some embodiments. The device 110 includes a processor 123, one or more communications interfaces 614, memory 126, a user interface 612, and one or more communication buses 610 for interconnecting these components. The communication buses 610 may include circuitry that interconnects and controls communications between system components. The user interface 612 includes the display 124 and keypad 125. The communications interface 614 includes the transceiver 122 and, in some embodiments, the transceiver 129. The memory 126 includes high-speed random access memory, such as DRAM, SRAM, DDR RAM and/or other random access solid state memory devices; and includes non-volatile memory, such as flash memory devices, a magnetic disk storage device, and/or other non-volatile solid state storage devices. The memory 126, or alternately non-volatile memory device(s) within the memory 126, includes a non-transitory computer-readable storage medium. While the memory 126 is shown as being separate from the processor 123, all or a portion of the memory 126 may be embedded in the processor 123. In some embodiments, the memory 126 stores the following programs, modules and data structures, or a subset thereof:

- an operating system 616 that includes procedures for handling various basic system services and for performing hardware dependent tasks;
- a communication module 618 that is used for communicating with other devices (e.g., with the secure element 130 and the management server 180, FIG. 1) via the communications interface 614; and
- applications 620, including one or more e-commerce applications 622 (e.g., ticketing applications; content, item and service purchase applications; and/or payment management applications), games 626, enterprise applications 628, and/or multimedia applications 630.

The communication module 618 also stores an identifier 632 of a secure element 130 that is physically coupled to the mobile communication device 110, for use in transmitting packets to the secure element 130, and the phone number 634 of the mobile communication device 110, for use in receiving messages from the secure element 130.

Associated with the e-commerce application(s) 622 are corresponding APIs for processing data received from other devices (e.g., the secure element 130 and the management server 180, FIG. 1) and data to be transmitted to the other devices. Similar APIs may be associated with the other applications 626, 628, and/or 630.

In some embodiments, the non-transitory computer-readable storage medium of the memory 126 includes instructions for performing all or a portion of the operations shown in the "mobile device communication 110" columns in FIGS. 4A-4D (except for the attaching operation 412, FIG. 4A). Likewise, the memory 126 includes instructions for performing all or a portion of the operations 504-512 in the method 500 (FIG. 5).

Each of the above identified elements in FIG. 6 may be stored in one or more of the previously mentioned memory devices in the memory 126. Each of the above identified modules corresponds to a set of instructions for performing functions described above. The above identified modules or programs (i.e., sets of instructions) need not be implemented as separate software programs, procedures or modules, and thus various subsets of these modules may be combined or otherwise re-arranged in various embodiments. In some embodiments, the memory 126 may store a subset of the modules and data structures identified above. Furthermore, the memory 126 may store additional modules and data structures not described above.

Figure 7:
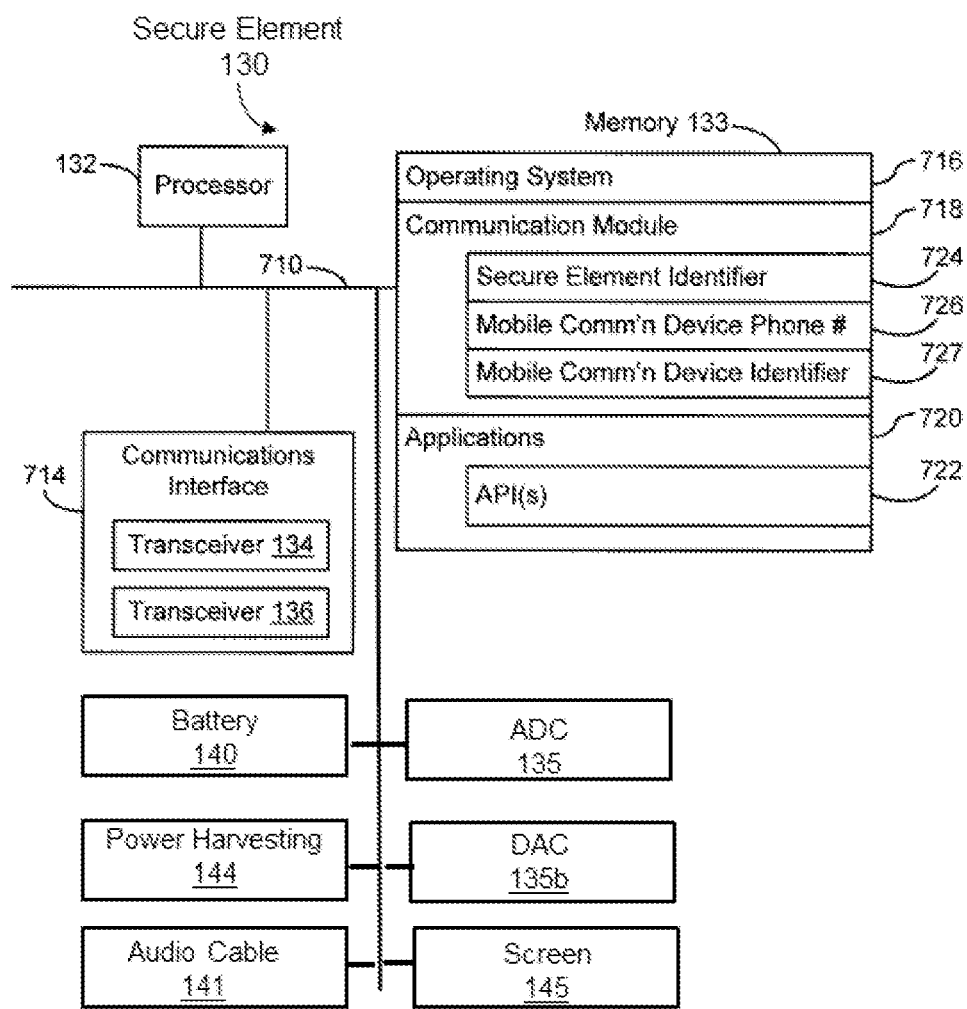
FIG. 7 is a block diagram illustrating a secure element to be physically coupled to a mobile communication device in accordance with some embodiments.
Figure 8:
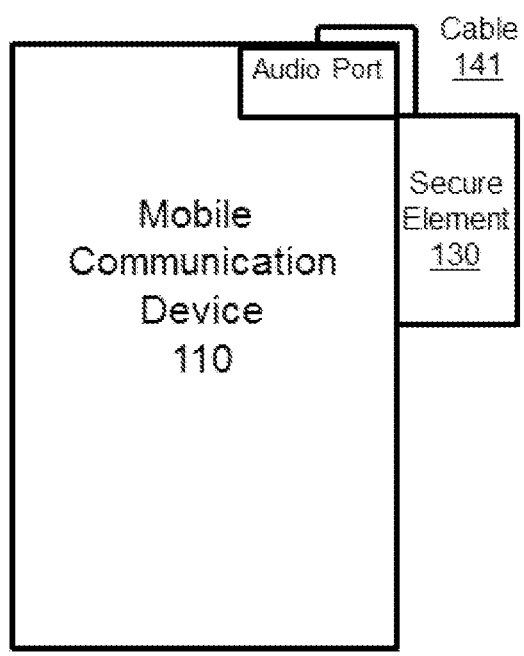
FIG. 8 is a diagram depicting a cable which connects the secure element to the audio port of the mobile communication device.

FIG. 7 is a block diagram illustrating a secure element 130 (e.g., as shown in FIGS. 3A-3E) in accordance with some embodiments. The secure element 130 includes a processor 132, one or more communications interfaces 714, memory 133, and one or more communication buses 710 for interconnecting these components. The communication buses 710 may include circuitry that interconnects and controls communications between components. The communications interface 714 includes the transceiver 134 and, in some embodiments, the transceiver 136. The memory 133 includes high-speed random access memory, such as DRAM, SRAM, DDR RAM and/or other random access solid state memory; and includes non-volatile memory, such as flash memory and/or other non-volatile storage. The memory 133, or alternately non-volatile memory within the memory 133, includes a non-transitory computer-readable storage medium. While the memory 133 is shown as being separate from the processor 132, all or a portion of the memory 133 may be embedded in the processor 132. In some embodiments, the memory 133 stores the following programs, modules and data structures, or a subset thereof:

- an operating system 716 that includes procedures for handling various basic system services and for performing hardware dependent tasks;
- a communication module 718 that is used for communicating with other devices (e.g., with the mobile communication device 110 and with POS and POE terminals 150, FIG. 1) via the communications interface 714; and
- one or more applications 720 (e.g., e-commerce applications) and associated APIs 722.

The communication module 718 stores an identifier 724 of the secure element 130 (e.g., an identifier of the transceiver 134 or 136), for use in receiving packets from the mobile communication device 110 to which the secure element 130 is physically coupled, and also stores the phone number 726 and identifier 727 of the mobile communication device 110, for use in transmitting messages to the mobile communication device 110.

In some embodiments, the memory 133 includes instructions for performing all of the operations shown in the "secure element 130" columns in FIGS. 4A-4D (except for the attaching operation 412 and charging operation 414, FIG. 4A). Likewise, the memory 126 includes instructions for performing all or a portion of the operations 514-524 in the method 500 (FIG. 5).

Each of the above identified elements in FIG. 7 may be stored in one or more of the previously mentioned components of the memory 133. Each of the above identified modules corresponds to a set of instructions for performing functions described above. The above identified modules or programs (i.e., sets of instructions) need not be implemented as separate software programs, procedures or modules, and thus various subsets of these modules may be combined or otherwise re-arranged in various embodiments. In some embodiments, the memory 133 may store a subset of the modules and data structures identified above. Furthermore, the memory 133 may store additional modules and data structures not described above.

The foregoing description, for purpose of explanation, has been described with reference to specific embodiments. However, the illustrative discussions above are not intended to be exhaustive or to limit the inventions to the precise forms disclosed. Many modifications and variations are possible in view of the above teachings. The embodiments were chosen and described in order to best explain the principles of the inventions and their practical applications, to thereby enable others skilled in the art to best utilize the inventions and various embodiments with various modifications as are suited to the particular use contemplated.

What is claimed is:

1. A system, comprising a mobile communication device and a secure element physically coupled to the mobile communication device, wherein:
   the mobile communication device comprises a first wireless transceiver, first processor, and first memory, first speaker, first microphone, first audio to digital converter, and first audio port;
   the secure element comprises a second, wireless transceiver, second processor, second memory, second speaker, second microphone, audio to digital converter, second digital to audio converter, and audio cable with a 3.5 mm plug that fits in the audio port of the mobile communication device;
   a first communication channel in which the secure element receives data via the second wireless transceiver from a POS or POE using a first protocol;
   a second communication channel in which the secure element transmits data non-wirelessly via the audio cable connected to the mobile device using a second channel and protocol different than the first channel and protocol;
   a third communication channel in which the mobile device transmits data via the first wireless transceiver to a management server using a third channel and third protocol different than the first and second channel and protocol.

2. The system of claim 1, wherein the secure element is affixed to the mobile communication device.

3. The system of claim 2 the transaction data transmitted from the secure element to the mobile device and management server are associated with an e-commerce or other transaction.

4. The system of claim 1, wherein the first communication channel uses digital radio waves at approximately 300 Mhz to send/receive data wirelessly between the secure element and the POS/POE using near field communication.

5. The system of claim 1, wherein the second channel transfers data non-wirelessly between the secure element and the mobile communication device using analog sound waves encoded with sigma delta and transmitted over the cable with a 3.55 mm plug that is attached to the secure element and connects into the audio port of the mobile communication device.

6. The system of claim 5 where the internal battery in the secure element is woken up and exits sleep mode after near field communication induction which occurs when the secure element is held in proximity to a POS/POE and an API in the secure element turns the second microphone on.

7. The system of claim 5 where an API in the mobile communication device transmits a low voltage signal from a battery in the mobile communication device over the cable to activate the secure element via near field communication induction and the power enables data to be transferred between the secure element and the mobile communication device.

8. The system of claim 5 where an API in the mobile communication device initiates analog signal over the cable to generate an electrical signal which will activate the secure element via induction and the power enables data to be transferred between the secure element and the mobile communication device.

9. The system of claim 1, wherein the third communications channel wirelessly transmits data between the mobile device and the management server using WIFI, CDMA, or GSM.

10. The system of claim 1, wherein:
    the second memory of the secure element stores an identifier associated with the secure element.

11. The system of claim 10, wherein the serial number of the NFC chip is the destination address.

12. The system of claim 1, wherein:
    the secure element comprises an NFC chip, the NFC chip comprising the second wireless transceiver, second processor, and second memory; and
    the identifier comprises a serial number of the NFC chip.

13. The system of claim 1, wherein:
    the first memory of the mobile communication device stores an application that, when executed by the first processor, generates sound waves and transmits them via the cable;
    and the second memory of the secure element stores an application that, when executed by the second processor, generates the messages and transmits the messages via the cable.

14. The system of claim 1, wherein:
    the first memory is configured to store data to be transmitted to the secure element via sound waves and data received from the secure element via sound waves; and
    the second memory is configured to store data to be transmitted to the mobile communication device via sound waves and data received from the mobile communication device via sound waves.

15. The system of claim 1, wherein the secure element is configured to use power received from a remote terminal to transmit data to the mobile communication device.

16. The system of claim 1, wherein the secure element further comprises power harvesting circuitry to harvest power from ambient RF signals.

17. The system of claim 1, wherein:
    the secure element further comprises a battery; and
    the secure element is configured to transmit data to the mobile communication device without receiving power from a remote terminal, using power from the battery.

18. A system, comprising a mobile communication device and a secure element physically coupled to the mobile communication device, wherein:
the mobile communication device comprises a first wireless transceiver, first processor, first memory, first microphone, first speaker, first analog to digital (ADC) converter, and first audio port;
the secure element comprises a second wireless transceiver, second processor, second memory, second speaker, second microphone, second analog to digital conversion (ADC), second digital to analog conversion (DAC), and an audio cable with 3.5 mm plug that can be inserted into the audio port of mobile communication device;
the mobile communication device is configured to transmit data via the cable to the secure element using sound waves, and
the secure element is configured to transmit sound waves via the cable to the mobile communication.

19. A method, comprising a mobile communication device and a secure element physically coupled to the mobile communication device, wherein;
the mobile communication device comprises a first wireless transceiver, first processor, and first memory, first speaker, first microphone, first audio to digital converter, and first audio port;
wirelessly receiving data at the secure element from a POS terminal via a second wireless transceiver using a first communication channel and a first protocol, wherein the secure element comprises the second wireless transceiver, second processor, second memory, second speaker, second microphone, second digital to analog conversion (DAC) and an audio cable with a 3.5 mm plug that fits in the audio port of the mobile communication device;
non wirelessly transmitting data from the secure element via the audio cable to the mobile device using a second channel and a second protocol different than the first channel and the first protocol;
wirelessly transmitting data from the mobile device via the first wireless transceiver to a management server using a third channel and a third protocol different than the first channel and the first protocol and the second channel and the second protocol.

20. The method of claim 19, wherein the secure element is adhesively attached to the mobile communication device.

21. The method of claim 20, wherein:
the secure element comprises an NFC chip, the NFC chip comprising the second wireless transceiver, second processor, and second memory; and
the identifier comprises a serial number of the NFC chip.

22. The method of claim 20, wherein:
the first memory of the mobile communication device stores an application that, when executed by the first processor, generates sound waves and transmits them via the cable; and the second memory of the secure element stores an application that, when executed by the second processor, generates the messages and transmits the messages via the cable.

23. The method of claim 20, wherein the secure element is configured to use power received from a remote terminal to transmit data to the mobile communication device.

24. The method of claim 20, wherein the secure element further comprises power harvesting circuitry to harvest power from ambient RF signals.

25. The method of claim 20, wherein:
the secure element further comprises a battery; and
the secure element is configured to transmit data to the mobile communication device without receiving power from a remote terminal, using power from the battery.

26. The method of claim 19, wherein the first communication channel uses digital radio waves at approximately 13 Mhz to send/receive data wirelessly between the secure element and the POS/POE using contactless protocols including NFC, ISO 1443, or Pay pass.

27. The method of claim 26, wherein:
the first memory is configured to store data to be transmitted to the secure element via sound waves and data received from the secure element via sound waves; and
the second memory is configured to store data to be transmitted to the mobile communication device via sound waves and data received from the mobile communication device via sound waves.

28. The method of claim 19, wherein the second channel transfers data non-wirelessly between the secure element and the mobile communication device using analog sound waves encoded with sigma delta and transmitted over a cable with a 3.55 mm plug that is attached to the secure element and connects into the audio port of the mobile communication device.

29. The method of claim 28 the transaction data transmitted from the secure element to the mobile device and management server are associated with an e-commerce or other transaction.

30. The method of claim 19, wherein the third communications channel wirelessly transmits data between the mobile device and the management server using conventional wireless including WIFI, CDMA, or GSM.

31. The method of claim 19 where an internal battery in the secure element is woken up and exits sleep mode after induction which occurs when the secure element is held in proximity to a POS/POE and an API in the secure element turns the second microphone on.

32. The method of claim 31 wherein the API in the mobile communication device initiates analog signal over the cable to generate an electrical signal which will activate the secure element via induction and the power enables data to be transferred between the secure element and the mobile communication device.

33. The method of claim 19 where an API (i.e. mobile wallet) in the mobile communication device transmits a low voltage signal from the battery in the mobile communication device over the cable to activate the secure element via induction and the power enables data to be transferred between the secure element and the mobile communication device.

34. The method of claim 19, wherein:
the second memory of the secure element comprises a memory element to store an identifier associated with the secure element.

35. The method of claim 34, wherein the the serial number of the NFC chip is the destination address.

36. A system, comprising a mobile communication device and a secure element physically coupled to the mobile communication device, wherein:
the mobile communication device comprises a first wireless transceiver, first processor, first memory, first microphone, first speaker, first analog to digital (ADC) converter, and first audio port;
the secure element comprises a second wireless transceiver, second processor, second memory, second speaker, second microphone, second analog to digital conversion (ADC), and audio cable with a 3.5 mm plug that can be inserted into the audio port of mobile communication device;

the mobile communication device is configured to transmit data via the cable to the secure element using sound waves, and
the secure element is configured to transmit sound waves via the cable to the mobile communication.

* * * * *